Oct. 1, 1940.    W. R. WILEY    2,216,219
CLIP
Filed June 5, 1939
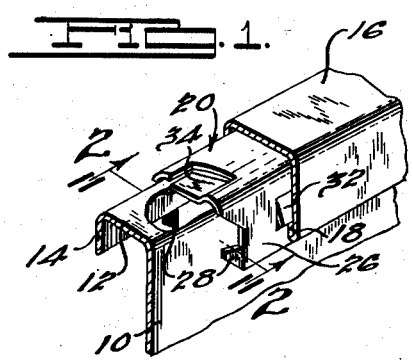
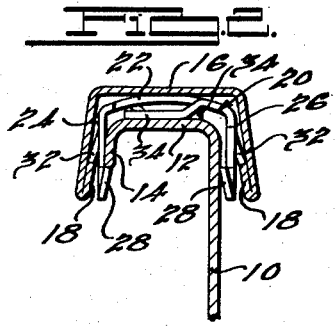
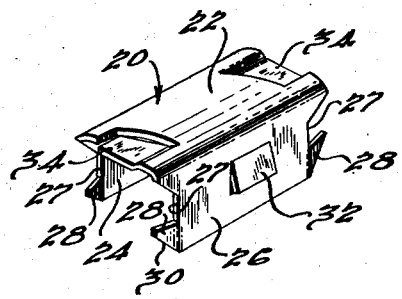
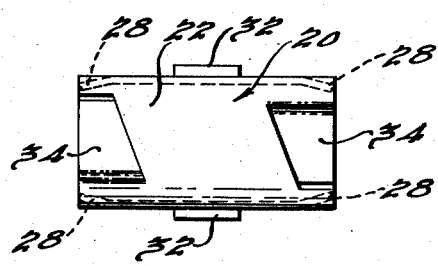
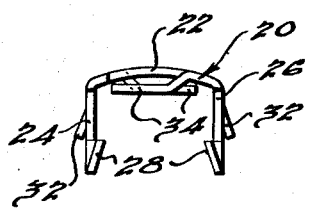
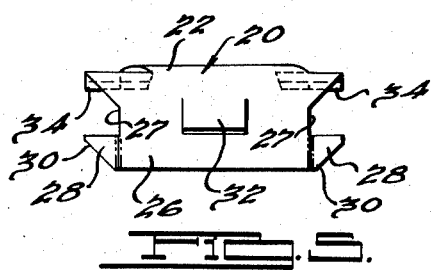
INVENTOR
William R. Wiley.
BY
Harness, Dickey & Pierce
ATTORNEYS.

Patented Oct. 1, 1940

2,216,219

UNITED STATES PATENT OFFICE 2,216,219

CLIP

William R. Wiley, Detroit, Mich.

Application June 5, 1939, Serial No. 277,393

6 Claims. (Cl. 24—73)

The present invention relates to clips and particularly relates to clips of the type employed in mounting ornamental moldings on supporting members, such as parts of an automobile body, for example.

One of the primary objects of the present invention is to provide a novel and improved clip construction for securing a generally channel-shaped moulding to a supporting bar or panel edge.

Another object of the present invention is to provide an improved clip of the type mentioned, which is extremely simple in construction, economical to manufacture, and readily applied.

A further object of the invention is to provide a generally channel-shaped clip adapted to be mounted on a supporting member of generally complementary shape and adapted to have mounted thereon a molding strip of generally complementary shape, to thereby secure said supporting member and said molding with respect to each other.

A further object of the invention is to provide an improved clip construction having oppositely directed securing means thereon for mounting an embracing member and an embraced member with respect to each other.

Other objects of the invention will become apparent from the following specification, the drawing relating thereto, and from the claims hereinafter set forth.

In the drawing, in which like numerals are used to designate like parts in the several views throughout:

Figure 1 is a fragmentary perspective view of a portion of a supporting panel having a molding strip mounted thereon by means of clips of the present invention;

Fig. 2 is a cross-sectional view taken substantially along the line 2—2 of Fig. 1;

Fig. 3 is a perspective view of the clip illustrated in Fig. 1;

Fig. 4 is a top plan view of the clip illustrated in Fig. 3;

Fig. 5 is a side elevational view of the clip illustrated in Fig. 3; and

Fig. 6 is an end elevational view of the clip illustrated in Fig. 3.

Referring to the drawing, a supporting member in the form of a sheet metal panel 10 is illustrated, having one edge thereof bent into generally channel-shape, having a base 12 and a side portion 14. The side portion 14 is substantially parallel to the major portion of the panel 10 and is also substantially flat, as is the panel, so that the edge of the panel 10 formed by the base 12 and side 14 is of substantial width.

A generally channel-shaped sheet metal molding 16 having the marginal edges 18 thereof folded inwardly upon the sides, is adapted to be mounted on the supporting member 10 by means of clips, generally indicated at 20. A plurality of such clips 20 are disposed on the panel 10, in a manner to be described in greater detail hereinafter, at spaced intervals therealong; and such clips are adapted to engage the panel and also engage the molding to thereby secure the molding and panel with respect to each other.

The clips forming the subject matter of the present invention are preferably formed from a single, integral sheet metal stamping made from a relatively high carbon steel, which, after being formed, is heat treated or otherwise tempered in order that it will be substantially harder than the sheet metal panels and molding strip with which it is associated, and which heat treating or tempering serves to materially increase the resiliency and elasticity of the clip as a whole.

The clip will, of course, be formed commercially by means of suitable dies. The clip 20 illustrated is generally channel-shaped, or U-shaped in transverse section, and includes a base portion 22 with integral sides 24 and 26. The sides 24 and 26 are substantially parallel to each other, are generally flat and are substantially the same depth. The sides 24 and 26 are each provided with recesses or cut away portions 27 in the side edges thereof forming resilient tabs or wings 28 on the side edges thereof adjacent the lower edges thereof. The wings or tabs 28 are turned or bent inwardly and provided with tapered under surfaces 30, which taper toward the lower edges of the sides 24 and 26 so as to provide cam surfaces to facilitate the application of the clips to the supporting panel, as will be pointed out hereinafter. The upper edges of the wings or tabs 28 are preferably normal to the side edges of the major portion of sides 24 and 26, so that the outer upper corner of the wings are offset inwardly from the planes of the sides 24 and 26.

The sides 24 and 26 are also provided with integral, resilient outstruck tabs 32 and such outstruck tabs 32 are preferably located substantially midway between tabs 28 in the major portion of sides 24 and 26. The tabs 32 are preferably struck outwardly so that the lower edges thereof are substantially at the same level as the top edges of the tabs 28 and so that such tabs 32 taper outwardly toward the lower or free edges of sides 24 and 26.

The base 22 of clip 20 is preferably slightly upwardly curved; and inwardly projecting, resilient fingers 34 are formed in the base 22 adjacent the ends thereof and are inwardly offset so as to provide stops or spacers in order to properly position the clip on the supporting panel. This is best shown in Figs. 3 and 6.

The clip 20 may be applied to the supporting panel 10 at suitably spaced intervals therealong and it is pointed out that the portion of the panel 10 to which the clips 20 are applied is substantially complementary in shape to the shape of the clip in the embodiment illustrated. In applying the clip 20 to the supporting panel the clips are placed in bridging relation to the base 12 of the supporting panel so that the tabs 28 on one of the arms of the clip engage the outer face of flange 14, and the tabs 28 on the other side of the clip engage the outer face of the major portion of panel 10. The clip may then be forced downwardly over such sides and since the tabs are resilient, such tabs will ride on the tapered or cam surfaces 30 thereof so that such tabs are resiliently urged outwardly during application of the clip to the supporting panel. The clips are forced onto the panel so that the arms or stops 34 abut against the top surface of base 12, and as the tabs or wings 28 are inherently, resiliently urged inwardly the outer top edges of such tabs engage the supporting panel to fix the clips thereon.

In the embodiment illustrated, the tabs 28 on side 26 engage the outer face of the major portion of panel 10 and will bite into such surface since the metal of the clips is substantially harder than the metal of panel 10. Also, in the embodiment illustrated, the tabs 28 on arm 24 are so constructed that the top edges of such tabs abut under the edge of flange 14 so as to secure the clip to the panel 10. It is to be understood, however, that the flange 14 could be of greater length or depth if desired, so that the tabs 28 on leg 24 would also bite into the metal of the outer surface of such flange in the same manner as tabs 28 on side 26 bite into the outer surface of the major portion of panel 10.

The molding strip 16 may be applied to clip 20 by embracing the clip 20 within the channel of molding strip 16. As the sides of strip 16 are disposed downwardly over the sides 24 and 26 of the clip, such sides will ride over the outer face of tabs 32 and such tabs being resilient may spring slightly inwardly until the molding 16 is in its final position relative to the clip. The tabs 32 then inherently are resiliently urged outwardly into engagement with the inner faces of the sides of the molding to lock the molding in position relative to the supporting panel. In the embodiment illustrated, the tabs 32 and the inturned portions 18 of molding 16 are so constructed and arranged that the bottom edges of tabs 32 abut against the top edges of inturned portions 18 in order to effect the locking engagement between the molding 16 and clip 20. It is, however, contemplated that such tabs also bite into the surfaces of the sides of the molding strip 16, so that the molding is locked to the clip. This is possible since the clips are materially harder than the metal of molding strip 16.

It will thus be evident from the above description that in the preferred embodiment of the invention described above, the attaching portion of supporting panel 10 is substantially complementary in shape to the shape of the clip 20 and that the molding 16 is also substantially complementary in shape to the shape of the clip 20. These shapes, however, can be modified within the teaching of the present invention, the essential features of which are the inturned and out-turned tabs formed on the clip which engage the supporting panel and the molding strip so that such molding strip and supporting panel are fixed relative to each other.

While the structure described above has particular utility in automobile construction, such structure also finds utility in other articles such as sheet metal cabinets, and the like, where it is desired to apply ornamental moldings to supporting panels.

Formal changes may be made in the specific embodiment of the invention described without departing from the spirit and substance of the invention, the scope of which is commensurate with the appended claims.

What is claimed is:

1. A clip construction comprising a generally channel-shaped metal member, the sides of said member each being provided with inturned and outturned tabs, said inturned and outturned tabs being so constructed and arranged as to engage inner and outer, generally complementary shaped members, respectively, to secure said inner and outer members with respect to each other.

2. A clip construction comprising a generally channel-shaped sheet metal member, the sides of said member being substantially parallel with each other and being provided with inturned and outturned tabs, said inturned and outturned tabs being so constructed and arranged as to engage inner and outer, generally complementary shaped members, respectively, to secure said inner and outer members with respect to each other.

3. A clip construction comprising a generally channel-shaped sheet metal member, the sides of said member being substantially parallel with respect to each other and being of substantially the same length, said sides each being provided with inturned and outturned tabs, said inturned and outturned tabs being so constructed and arranged as to engage inner and outer generally complementary shaped members, respectively, to secure said inner and outer members with respect to each other.

4. A clip construction comprising a generally channel-shaped sheet metal member, the sides of said member being substantially straight and being provided with inturned and outturned tabs, said inturned tabs being provided on the side edges of said sides and said outturned tabs being provided in said sides intermediate said inturned tabs, the construction and arrangement of said inturned and outturned tabs being such as to engage inner and outer generally complementary shaped members, respectively, to secure said inner and outer members with respect to each other.

5. A clip construction comprising a generally channel-shaped sheet metal member, the sides of said member being substantially straight, integral inturned tabs formed on the side edges of said sides with the outer edges of said tabs sloped toward said side edges thereby forming cam edges, outturned tabs formed integral with said sides intermediate said inturned tabs, the construction and arrangement of said inturned and outturned tabs being such as to resiliently engage inner and outer generally complementary shaped members, respectively, to secure said inner and outer members with respect to each other.

6. A clip construction comprising a generally channel-shaped sheet metal member, the sides of said member each being provided with inturned and outturned tabs, said inturned and outturned tabs being so constructed and arranged as to engage inner and outer generally complementary shaped members, respectively, to secure said inner and outer members with respect to each other, the base of said channel-shaped member being formed with inset portions providing spacers and adapted to abut against said inner member.

WILLIAM R. WILEY.